(12) United States Patent
Granata

(10) Patent No.: US 6,601,826 B1
(45) Date of Patent: Aug. 5, 2003

(54) LOW-LEVEL LIFT

(75) Inventor: Tebaldo Granata, Cappelle sul Tavo (IT)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/110,608

(22) PCT Filed: Oct. 12, 1999

(86) PCT No.: PCT/IB99/01774

§ 371 (c)(1),
(2), (4) Date: Apr. 12, 2002

(87) PCT Pub. No.: WO01/27499

PCT Pub. Date: Apr. 19, 2001

(51) Int. Cl.$^7$ .................................................. B66F 3/22
(52) U.S. Cl. ....................... 254/122; 254/126
(58) Field of Search ................. 254/122, 126, 254/124, 8 C, 9 R, 9 B, 9 C, 10 R, 10 B, 10 C

(56) References Cited

U.S. PATENT DOCUMENTS

| | | | | |
|---|---|---|---|---|
| 3,891,108 A | * | 6/1975 | Traficant | 254/124 |
| 4,526,346 A | | 7/1985 | Galloway et al. | |
| 4,638,610 A | * | 1/1987 | Heikkinen | 254/122 |
| 4,858,888 A | * | 8/1989 | Cruz et al. | 254/122 |
| 5,192,053 A | * | 3/1993 | Sehlstedt | 254/122 |
| 6,464,205 B2 | * | 10/2002 | Wanner | 254/122 |

FOREIGN PATENT DOCUMENTS

| | | |
|---|---|---|
| EP | 0613852 | 9/1974 |
| EP | 0372246 | 6/1990 |
| EP | 0937677 | 8/1999 |

* cited by examiner

Primary Examiner—Lee D. Wilson
(74) Attorney, Agent, or Firm—Ostrolenk, Faber, Gerb & Soffen, LLP

(57) ABSTRACT

A description is provided of a lift which is defined as "low-level", owing to the fact that in the articulation position in which the scissors are closed, the oleodynamic cylinder which generates the thrust force does not project above the height of the folded arms of the scissors-type articulation. The lift according to the invention comprises: a scissors-type articulation with a plurality of arms, and means for generating a thrust force, in order to bring the said scissors-type articulation from a closed position to a position which is at least partially open, and corresponds to partial or total lifting, the said means for generating a thrust force acting along a direction of thrust, characterized in that it additionally comprises a mobile lever which is pivoted at a fulcrum point which is spaced from the said direction of thrust, and against which the said means for generating a thrust force act in a pivoting manner.

9 Claims, 2 Drawing Sheets

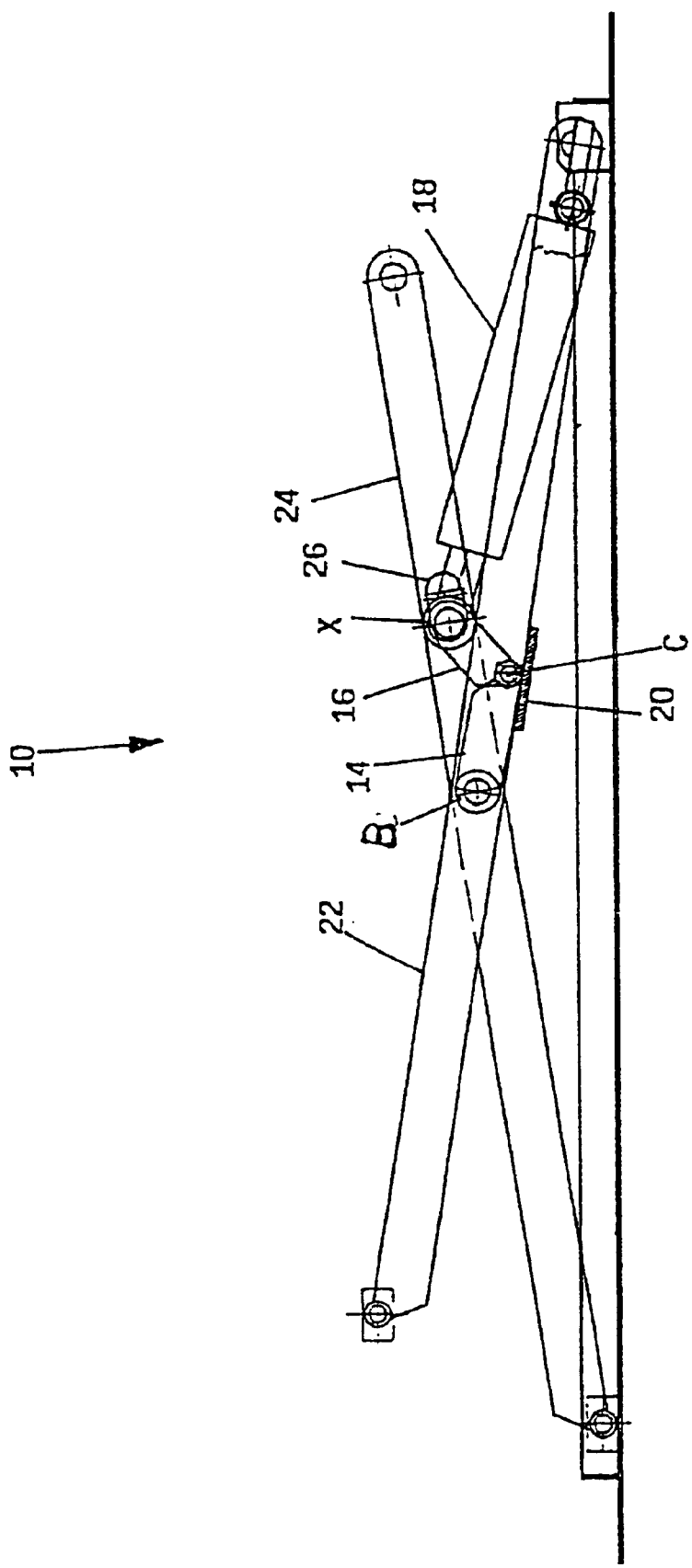

LOW-LEVEL LIFT

BACKGROUND OF THE INVENTION

The present invention relates to a scissors-type lift, in particular to a vehicle lift which has a reduced height in the fully closed position, and which for this reason is defined as "low-level".

The U.S. Pat. No. 4,526,346 discloses a lift (10) which comprises a scissors-type articulation with a plurality of arms, and an oleodynamic cylinder for generating a thrust force, in order to bring the said scissors-type articulation from a closed position to a partial or total lifting position. Additionally, the lift comprises a mobile lever which is pivoted at a fulcrum point. The fulcrum point is spaced from the direction of thrust, and the oleodynamic cylinder acts in a pivoting manner against the fulcrum. The mobile lever is pivoted further relative to a semi-fixed lever, which in turn is pivoted at a fulcrum point of the scissors-type articulation.

The arms of the scissors-type are connected to a lifting runway or platform, thus giving rise to upward thrust which can support a load. Lifts of this type are mostly used "recessed", i.e. the lift is embedded in the ground by means of appropriate foundations, such that there is no obstruction on the ground, and in order to obtain more space which can be used in a working environment.

In order to be able to open the scissors-type articulation, the oleodynamic cylinder must have good inclination, so that lift, it is obviously necessary to have a foundation in the floor with a depth of no less than 250 mm.

However, in many working environments, conditions are such that it is not possible to produce such a deep foundation, since there is a floor which is less thick than the height of the foundation required in order to embed the scissors-type lift.

SUMMARY OF THE INVENTION

The object of the present invention is to eliminate this disadvantage by means of a "low-level" scissors-type lift, which has a height no greater than 120 mm. This is possible by means of use of a lever-type kinematic mechanism as illustrated hereinafter.

The low-level scissors-type lift according to the present invention has the characteristics specified.

BRIEF DESCRIPTION OF THE DRAWINGS

There now follows a detailed description of the invention, provided purely by way of non-limiting example, to be read with reference to the attached illustrative drawings, in which the various figures show the following:

FIG. 2 shows a single-scissors-type lift according to the present invention, in an intermediate lifting position.

DESCRIPTION OF PREFERRED EMBODIMENTS

It is apparent that the same reference numbers in the various figures are used to indicate the same parts, or components which are functionally equivalent.

In addition, for the sake of greater clarity, and to avoid limiting unduly the scope of the invention, the lift is shown substantially "bare", i.e. without any runway or arm in order to support the vehicle, and without any other accessory, for example safety devices according to the known art, which are not directly relevant to the invention.

Figure 1:
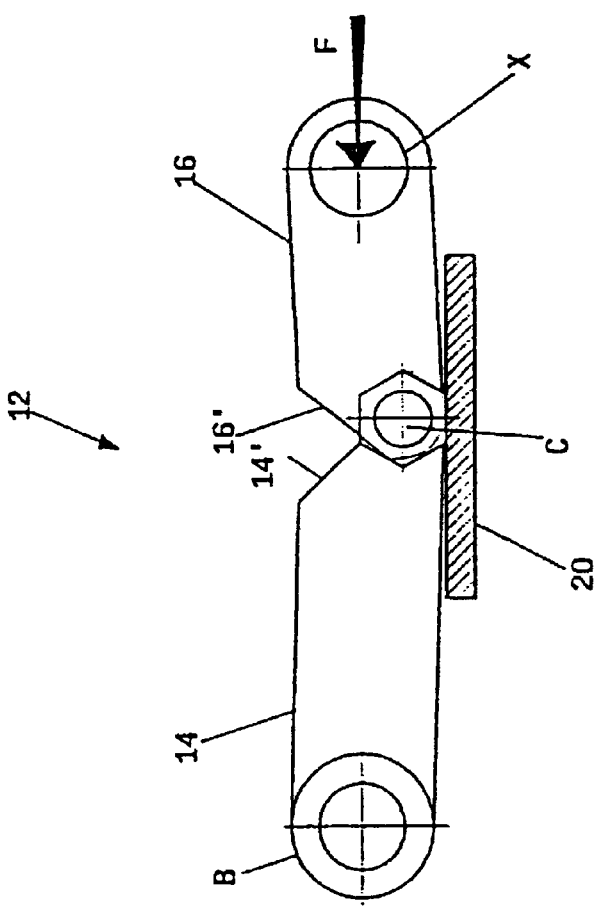
FIG. 1 shows the innovative kinematic mechanism according to the present invention.

With reference initially to FIG. 1, the kinematic mechanism 12 consists of a semi-fixed lever 14 (the reason for the latter being "semi-fixed" will become apparent hereinafter), and of a mobile, or "impetus" lever 16. The semi-fixed lever 14 and the mobile lever 16 are hinged or pivoted relative to one another at the point C, such as to permit rotation between them. At its end B opposite the point C, the semi-fixed lever 14 is pivoted relative to an arm 22 of the scissors-type articulation; substantially the point B is a fixed anchorage point, which acts as a stop for the entire kinematic mechanism. Onto a fulcrum or point X at the end of the mobile lever 16, there is secured an oleodynamic cylinder 18, the direction of thrust of which in the starting position (FIG. 1) is towards the anchorage point B (force F).

At their fulcrum point C, the lever 14 and the lever 16 are shaped such as to have a respective bevelled or inclined surface 14' and 16'.

As can be seen clearly in FIG. 1, as well as in the other figures, the lift 10 according to the invention comprises means 20 which can prevent downward rotation of the semi-fixed lever 14 at the start of lifting, and thus define the position of starting or rest of the kinematic mechanism. Advantageously, these means are in the form of a plate 20 which is secured (i.e. welded) to the arm 22 of the lift 10. In another arm 24 of the lift 10, which is pivoted relative to the arm 22, there is provided a slot 26 in which the fulcrum X moves.

The kinematic mechanism functions as follows.

In order to obtain a lift 10 with a low profile (with a maximum height of 120 mm), the unit 18 which generates the thrust, and in this case an oleodynamic cylinder 18, must be positioned such that its dimensions do not exceed the height of the profiled section itself. Thus, initially, the oleodynamic cylinder 18 assumes a position with an angle of 0 relative to the horizontal line of the profiled section. However, the rod of the oleodynamic cylinder 18 acts along a direction of thrust which is indicated by the force F, and is slightly spaced from the fulcrum point C: the force F can thus create torque relative to C, which in turn is sufficient to rotate the lever 16.

However, in order to be able to open the scissors, which are the support structure of the lift, it is necessary to deflect the thrust force F of the cylinder from the horizontal position to the vertical position, and this process is carried out by the lever-type kinematic mechanism according to the present invention.

Figure 3:
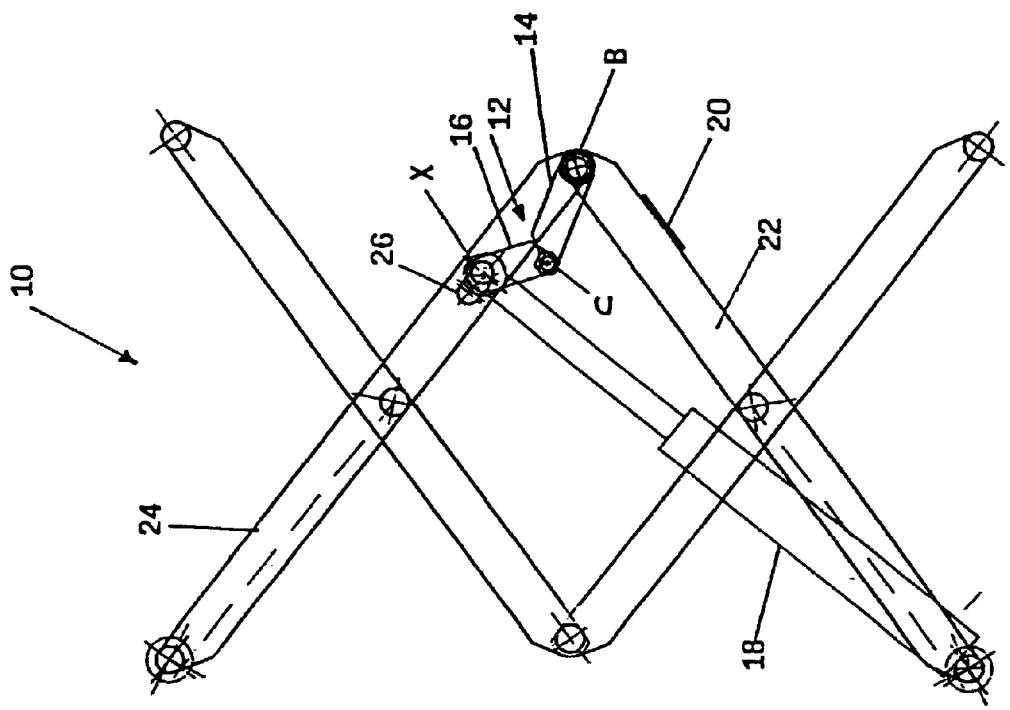
FIG. 3 shows a double-scissors-type lift, in a condition substantially of complete extension, or of maximum lifting.

In FIG. 2, the lower part of the oleodynamic cylinder 18 is secured to the wide arm 22 of the scissors, and its upper part is secured to the narrow arm 24 and to the lever 16. The semi-fixed lever 14 remains in its initial position until the oleodynamic cylinder 18 acts directly, and has thus completed its path in the slot 26 on the inner arm of the scissors; at this point the semi-fixed lever 14 is drawn by the mobile lever (again see FIG. 2), until the maximum height is reached (see FIG. 3).

It is apparent that many modifications, adaptations and substitutions of parts can be made to the emodiments described in detail and illustrated in the attached illustrative drawings, using alternatives which are functionally equivalent, without departing from the protective context of the following claims.

What is claimed is:

1. A lift comprising:

a scissors articulation including a pair of arms, the arms each having ends and the arms being articulated to each other at a first fulcrum intermediate their ends;

a thrust force generator operable for generating thrust force along a thrust direction, the thrust force generator being connected with the articulation and being adapted for urging the scissors articulation from a closed position with the pair of arms collapsed at a relatively closed orientation and to an at least partially opened position with the arms intersecting at a greater angle than at the closed position and corresponding to a lifted position;

a mobile lever pivoted at a second fulcrum, and the second fulcrum is spaced off the direction of thrust of the thrust generator;

a semi-fixed lever pivoted to the mobile lever at the second fulcrum; the semi-fixed lever is also pivoted at the first fulcrum;

a slot in one arm, and a pin on the mobile lever moving through the slot and there defining a third fulcrum for the mobile lever at the one arm, the pin enables pivoting between the mobile lever and the force generator, the force generator generates a thrust force acting at the third fulcrum;

a stop for limiting rotation movement of the semi-fixed lever to establish an end position for the arms with the arms toward a closed position.

2. The lift of claim 1, wherein the stop for limiting rotation of the semi-fixed lever comprises a plate mounted on one of the arms and in a position to be below the semi-fixed lever.

3. The lift of claim 1, wherein each of the mobile lever and the semi-fixed lever have respective cooperating lever surfaces which cooperate at the second fulcrum between the levers without each lever interfering with movement of the other lever.

4. The lift of claim 1, wherein the articulation comprises a single scissors articulation having two arms.

5. The lift of claim 1, wherein the articulation comprises a double scissors articulation with two sets of the articulated arms, and each arm of each articulation is pivotally connected to an arm of the other articulation.

6. The lift of claim 1, wherein the thrust force generator comprises an oleodynamic cylinder connected to the articulation.

7. The lift of claim 6, wherein the thrust force generator has a selected height such that with the arms in a closed position, the thrust generator has a height which is substantially not greater than the height of the arms in the closed position.

8. The lift of claim 1, wherein the thrust force generator has a selected height such that with the arms in a closed position, the thrust generator has a height which is substantially not greater than the height of the arms in the closed position.

9. The lift of claim 1 further comprising elements thereon for supporting an object on the lift.

* * * * *